Dec. 29, 1931.   R. P. F. LIDDELL   1,838,100
LUBRICATOR
Filed May 25, 1929
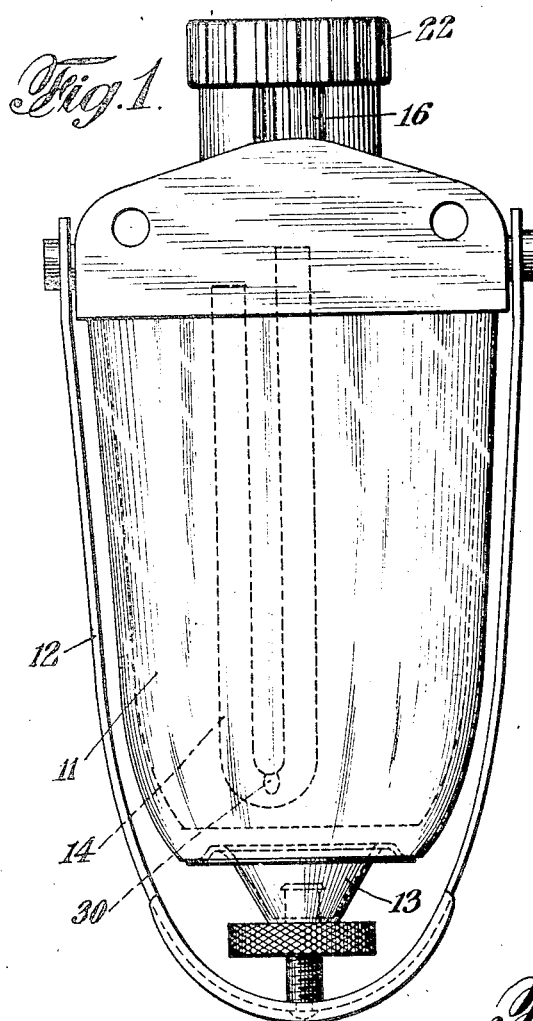
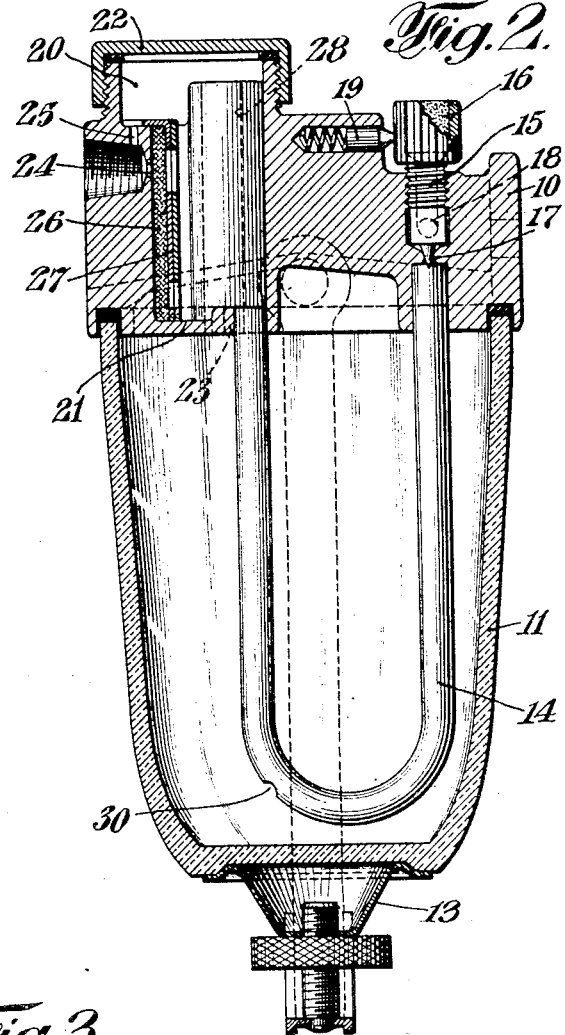
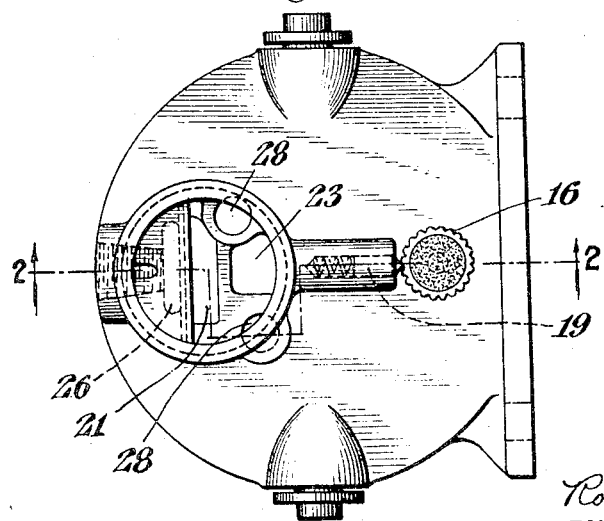
INVENTOR
Robert P. F. Liddell
BY
Kenyon & Kenyon
ATTORNEYS Patented Dec. 29, 1931

1,838,100

UNITED STATES PATENT OFFICE

ROBERT P. F. LIDDELL, OF NEW YORK, N. Y., ASSIGNOR TO MOTOR IMPROVEMENTS, INC., OF NEWARK, NEW JERSEY, A CORPORATION OF DELAWARE

LUBRICATOR

Application filed May 25, 1929. Serial No. 365,830.

This invention relates to lubricators and more especially to devices of this character for supplying lubricant to the cylinders of internal combustion engines.

An object of this invention is an improved, inexpensive and efficient lubricator for furnishing lubricant to the cylinders of an internal combustion engine.

A lubricator embodying the invention comprises a reservoir into which extends a U-shaped tube, one end of which is open to the atmosphere. The other end communicates with a chamber in which a partial vacuum is maintained so that air is caused to flow through the tube. A small aperture is provided in the leg of the tube leading to the chamber and oil is admitted to the tube through this hole, oil being carried by the air current up into the chamber. The chamber is connected by a suitable pipe to the intake manifold of an engine. The outlet from the chamber to this pipe is above the level of the oil in the chamber and a wick is so arranged that it intercepts air flowing through said outlet. The wick depends into the supply of oil in the bottom of the chamber. Air passing through the tube carries oil up into the chamber to maintain a supply of oil therein, an overflow being provided to limit the depth of oil in the chamber. Air, in passing out of the chamber, passes through the wick and picks up oil therefrom which it carries to the engine cylinders by way of the intake manifold.

Other objects, novel features and advantages of this invention will be apparent from the following specification and accompanying drawings, wherein:

Fig. 1 is a side elevation of a lubricator embodying the invention.

Fig. 2 is a section on the line 2—2 of Fig. 3, and

Fig. 3 is a plan view of the lubricator.

The lubricator comprises a head or casting 10 and a cup or the like 11, the rim of which fits in a circular groove provided in the head and is forced against a gasket in such groove by means of a yoke 12 pivoted to the head and having an adjustable member 13 bearing against the bottom of the cup. A U-shaped tube 14 has its ends seated in recesses formed in the head 10 and has its bight portion depending into the cup 11. One of these recesses communicates by way of a small diameter passage with another recess in which is arranged a screw 15 having a knurled head 16, and a pivot 17 extending into the connecting passageway. The screw 15 is provided with a bore which terminates in a lateral port 18. In the bore of the screw there is provided a felt plug and a spring pressed dog 19 is provided for engaging the head 16 to hold the screw 15 in any given position. The other end of the tube 14 communicates with a chamber 20 in the head, which is provided with a well 21. This chamber is closed by the cap 22 threaded on a boss provided for that purpose. An overflow aperture 23 is provided in the bottom of the chamber 20 so that after the well 21 is filled up, oil is returned from the chamber to the cup. The chamber is provided with two outlet ports 24 and 25 leading to a threaded socket in which may be screwed a suitable pipe fitting for a pipe leading to the intake manifold of an engine. A wick 26 is arranged to intercept air passing out the outlet 24 and depends into the well 21, the wick being held in place by a plate 27 welded to the inner wall of the chamber. This plate is provided with apertures for permitting oil to reach the wick and for permitting air to pass through the wick to the outlet 24.

When this lubricator is in use, the chamber 20 is maintained under partial vacuum due to the connection of the same with the intake manifold of the engine by a pipe running from the port 24. Air is drawn in through the screw 15 and tube 14, the amount of air being regulated by adjusting the screw 15 and the air being filtered by passing through the felt pad 16. The current of air carries oil up through the tube 14 into the chamber 20 and the oil fills the well 21 into which the wick 26 depends. Air passes from the chamber through the wick 26 and port 24 and also through the port 25 to the intake manifold of the engine. The air passing through the wick picks up oil from the wick and carries the same into the intake manifold so that lubrication of the cylinders is effected. The port 25 constitutes a by-pass so that only a portion of the air drawn in through the screw 15 is utilized to entrain oil from the wick 26. This permits a much finer adjustment of the amount of oil carried into the cylinder by regulation of the screw 15 than would be possible if all of the air passed through the wick. Any excess of oil in the chamber above that necessary to fill the well 21 drains back into the cup 11 through the opening 23. By removing the cap 22, the oil in the cup 11 may be easily replenished. A vent bore 28 is provided in the head to permit escape of air from the cup 11 when oil is introduced into the chamber 20 for filling purposes, the oil running into the cup from the chamber to the aperture 23. When it is desired to clean the cup 11, it may be removed by releasing the member 33 and swinging the yoke 12 into inoperative position.

It is of course understood that various structural modifications may be made in the device above described, without in any way departing from the spirit of the invention as defined in the appended claims.

I claim:

1. A lubricator comprising an oil reservoir, a chamber, a conduit leading through the oil reservoir, said conduit being in communication with said chamber at one end and with the atmosphere at the other end and having provision for admitting oil thereinto from said reservoir, an outlet from said chamber and a fibre strip arranged to intercept air passing through said outlet, said fibre strip having one end adapted to extend into the oil contained in the chamber.

2. A lubricator comprising an oil reservoir, a chamber, a conduit leading through the oil reservoir, said conduit being in communication with said chamber at one end and with the atmosphere at the other end and having provision for admitting oil thereinto from said reservoir, an outlet from said chamber, a fibre strip arranged to intercept air passing through said outlet, said fibre strip having one end adapted to extend into the oil contained in the chamber, and means for controlling the flow of air through said conduit.

3. A lubricator comprising an oil reservoir, a chamber, a conduit leading through the oil reservoir, said conduit being in communication with said chamber at one end and with the atmosphere at the other end and having provision for admitting oil thereinto from said reservoir, an outlet from said chamber, a fibre strip arranged to intercept air passing through said outlet, said fibre strip having one end adapted to extend into the oil contained in the chamber, and means for filtering the air flowing through said conduit.

4. A lubricator comprising an oil reservoir, a chamber, a conduit leading through the oil reservoir, said conduit being in communication with said chamber at one end and with the atmosphere at the other end and having provision for admitting oil thereinto from said reservoir, an outlet from said chamber, a fibre strip arranged to intercept air passing through said outlet, said fibre strip having one end adapted to extend into the oil contained in the chamber, means for controlling the flow of air through said conduit, and means for filtering the air flowing through said conduit.

5. A lubricator comprising an oil reservoir, a chamber, a conduit leading through the oil reservoir, said conduit being in communication with said chamber at one end and with the atmosphere at the other end and having provision for admitting oil thereinto from said reservoir, an outlet from said chamber and a fibre strip arranged to intercept air passing through said outlet, said fibre strip having one end adapted to extend into the oil contained in the chamber, said chamber having overflow means to return excess oil to said reservoir.

6. A lubricator comprising an oil reservoir, a U-shaped tube having its central portion depending into the reservoir and having one end open to the atmosphere, a chamber with which the other end of the tube communicates, said tube having an aperture for admitting oil into it from the reservoir, an outlet from the said chamber and a fibrous strip arranged to intercept air passing through said outlet, said fibrous strip having one end depending to the bottom of said chamber.

7. A lubricator comprising an oil reservoir, a U-shaped tube having its central portion depending into the reservoir and having one end open to the atmosphere, a chamber with which the other end of the tube communicates, said tube having an aperture for admitting oil into it from the reservoir, an outlet from the said chamber and a fibrous strip arranged to intercept air passing through said outlet, said fibrous strip having one end depending the bottom of said chamber, and means for filtering the air flowing through said tube.

8. A lubricator comprising an oil reservoir, a U-shaped tube having its central portion depending into the reservoir and having one end open to the atmosphere, a chamber with which the other end of the tube communicates, said tube having an aperture for admitting oil into it from the reservoir, an outlet from the said chamber and a fibrous strip arranged to intercept air passing through said outlet, said fibrous strip having one end depending to the bottom of said chamber, said chamber having overflow means to return excess oil to said reservoir.

9. A lubricator comprising a head, a cup-shaped member attached thereto and constituting an oil reservoir, a U-shaped tube having its ends attached to said head, a chamber in said head, one end of the tube communicating with said chamber and the other end communicating with the atmosphere, said tube having an aperture for admitting oil thereinto from said reservoir, an outlet from said chamber, and a fibrous strip arranged to intercept air passing to said outlet, said fibrous strip extending to the bottom of said chamber.

10. A lubricator comprising a head, a cup-shaped member attached thereto and constituting an oil reservoir, a U-shaped tube having its ends attached to said head, a chamber in said head, one end of the tube communicating with said chamber and the other end communicating with the atmosphere, said tube having an aperture for admitting oil thereinto from said reservoir, an outlet from said chamber, a fibrous strip arranged to intercept air passing to said outlet, said fibrous strip extending to the bottom of said chamber, and means for filtering the air flowing through said tube.

11. A lubricator comprising a head, a cup-shaped member attached thereto and constituting an oil reservoir, a U-shaped tube having its ends attached to said head, a chamber in said head, one end of the tube communicating with said chamber and the other end communicating with the atmosphere, said tube having an aperture for admitting oil thereinto from said reservoir, an outlet from said chamber, and a fibrous strip arranged to intercept air passing to said outlet, said fibrous strip extending to the bottom of said chamber, said chamber having overflow means for returning excess oil to said reservoir.

12. A lubricator comprising an oil reservoir, a chamber, a conduit leading through said reservoir, said conduit being in communication with said chamber at one end and with the atmosphere at the other end and having provision for admitting oil thereinto from said reservoir, a pair of outlet ports leading from said chamber and a fibre strip arranged to intercept air passing through one of said outlet ports, said fibre strip having one end adapted to extend into the oil contained in the chamber.

13. A lubricator comprising an oil reservoir, a chamber, a conduit leading through said reservoir, said conduit being in communication with said chamber at one end and with the atmosphere at the other end and having provision for admitting oil thereinto from said reservoir, an outlet from said chamber, a fibre strip arranged to intercept a portion of the air passing through the outlet, said fibre strip having one end adapted to extend into the oil contained in the chamber, and means for controlling the flow of air through said conduit.

14. A lubricator comprising an oil reservoir, a chamber, a U-shaped tube having its central portion depending into the reservoir and having one end open to the atmosphere, a chamber with which the other end of the tube communicates, said tube having an aperture for admitting oil into it from the reservoir, an outlet from said chamber, and a fibre strip arranged to intercept a portion of the air passing through said outlet, said fibre strip having one end depending to the bottom of said chamber.

15. A lubricator comprising an oil reservoir, a U-shaped tube having its central portion depending into the reservoir and having one end open to the atmosphere, a chamber with which the other end of the tube communicates, said tube having an aperture for admitting oil into it from the reservoir, a pair of outlet ports for said chamber, and a fibre strip arranged to intercept air passing through one of said ports, said fibre strip having one end depending to the bottom of the chamber.

16. A lubricator comprising a head, a chamber in said head, a cup-shaped member attached thereto and constituting an oil reservoir, a U-shaped tube having its ends attached to said head, one end of the tube communicating with said chamber and the other end communicating with the atmosphere, said tube having an aperture for admitting oil thereinto from said reservoir, a through one of said outlets ports, said fibre strip arranged to intercept air passing through one of said outlet ports, said fibre strip extending to the bottom of said chamber and said chamber being provided with overflow means for returning excess oil to said reservoir, and means for filtering the air flowing into said tube.

In testimony whereof, I have signed my name to this specification.

ROBERT P. F. LIDDELL.

CERTIFICATE OF CORRECTION.

Patent No. 1,838,100.             Granted December 29, 1931, to

ROBERT P. F. LIDDELL.

It is hereby certified that error appears in the printed specification of the above numbered patent requiring correction as follows: Page 3, line 98, claim 16, after the article "a" insert pair of outlet ports for said chamber, and line 99, same claim, strike out the words "through one of said outlet ports, said fibre" and insert instead a fibre; and that the said Letters Patent should be read with these corrections therein that the same may conform to the record of the case in the Patent Office.

Signed and sealed this 9th day of February, A. D. 1932.

(Seal)
                                                      M. J. Moore,
                                       Acting Commissioner of Patents.